United States Patent
O'Callaghan

[11] Patent Number: 5,956,951
[45] Date of Patent: Sep. 28, 1999

[54] ADJUSTABLE MAGNETO-RHEOLOGICAL FLUID DEVICE

[75] Inventor: Michael G. O'Callaghan, Erie, Pa.

[73] Assignee: MR Technologies, Girard, Pa.

[21] Appl. No.: 08/718,199

[22] Filed: Sep. 20, 1996

[51] Int. Cl.[6] .................................................. F16D 37/02
[52] U.S. Cl. ............................ 60/326; 91/4 A; 188/267.1; 188/267.2
[58] Field of Search ................... 60/326; 91/4 R, 91/4 A; 188/267, 267.1, 267.2

[56] References Cited

U.S. PATENT DOCUMENTS

| | | |
|---|---|---|
| 2,667,237 | 1/1954 | Rabinow . |
| 2,846,028 | 8/1958 | Gunther . |
| 2,973,969 | 3/1961 | Thall . |
| 3,006,656 | 10/1961 | Schaub . |
| 3,059,915 | 10/1962 | Kemelhor ..................................... 267/1 |
| 3,321,210 | 5/1967 | Delchev . |
| 3,599,428 | 8/1971 | Chaney et al. ............................. 60/326 |
| 4,200,003 | 4/1980 | Miller . |
| 4,351,515 | 9/1982 | Yoshida . |
| 4,401,298 | 8/1983 | Eaton et al. . |
| 4,416,445 | 11/1983 | Coad . |
| 4,583,723 | 4/1986 | Ozawa . |
| 4,673,067 | 6/1987 | Münning et al. . |
| 4,679,775 | 7/1987 | Funaki et al. . |
| 4,699,348 | 10/1987 | Freudenberg . |
| 4,706,945 | 11/1987 | Watanabe et al. . |
| 4,709,779 | 12/1987 | Takehara . |
| 4,729,224 | 3/1988 | McAteer ..................................... 91/4 R |
| 4,753,421 | 6/1988 | Makibayashi et al. . |
| 4,756,513 | 7/1988 | Carlson et al. . |
| 4,787,610 | 11/1988 | Kojima et al. . |
| 4,789,142 | 12/1988 | Hoying et al. . |
| 4,819,772 | 4/1989 | Rubel . |
| 4,827,672 | 5/1989 | Brandt et al. ............................. 91/4 R |
| 4,858,733 | 8/1989 | Noguchi et al. ........................ 188/267 |
| 4,872,652 | 10/1989 | Rohner et al. . |
| 4,880,216 | 11/1989 | Härtel et al. . |
| 4,896,752 | 1/1990 | Shtarkman . |
| 4,899,996 | 2/1990 | Maassen et al. . |
| 4,942,947 | 7/1990 | Shtarkman . |
| 4,958,704 | 9/1990 | Leiber et al. . |
| 4,973,031 | 11/1990 | Takano et al. . |
| 4,973,854 | 11/1990 | Hummel . |
| 4,992,190 | 2/1991 | Shtarkman . |
| 5,018,606 | 5/1991 | Carlson . |
| 5,029,677 | 7/1991 | Mitsui . |
| 5,042,253 | 8/1991 | Kataoka ..................................... 91/4 R |
| 5,080,392 | 1/1992 | Bazergui . |
| 5,145,156 | 9/1992 | Muramatsu et al. . |
| 5,176,368 | 1/1993 | Shtarkman . |
| 5,277,281 | 1/1994 | Carlson et al. . |
| 5,284,330 | 2/1994 | Carlson et al. . |
| 5,293,969 | 3/1994 | Yamaoka et al. . |
| 5,398,917 | 3/1995 | Carlson et al. . |

FOREIGN PATENT DOCUMENTS

| | | |
|---|---|---|
| 3800678 | 7/1989 | Germany . |
| 57-129944 | 8/1982 | Japan . |
| 1282568 | 7/1972 | United Kingdom . |

*Primary Examiner*—F. Daniel Lopez
*Attorney, Agent, or Firm*—Webb Ziesenheim Bruening Logsdon Orkin & Hanson, P.C.

[57] ABSTRACT

An adjustable magneto-rheological fluid device includes a movable piston adjacent a first chamber containing a first hydraulic fluid for moving the piston. The first hydraulic fluid interacts with a flexible magneto-rheological compartment containing a magneto-rheological fluid that flows between a first magneto-rheological fluid chamber and a second magneto-rheological fluid chamber. By controlling the flow of the magneto-rheological fluid, the device controls the first hydraulic fluid in the first chamber to bias the piston in a first direction. Additionally, the magneto-rheological fluid device may include a second chamber, containing a second hydraulic fluid, spaced apart from the first chamber on the opposite side of the piston. The second hydraulic fluid interacts with the flexible magneto-rheological compartment allowing the device to control the second hydraulic fluid to bias the piston in a second direction opposite the first direction.

7 Claims, 4 Drawing Sheets

ADJUSTABLE MAGNETO-RHEOLOGICAL FLUID DEVICE

BACKGROUND OF THE INVENTION

1. Field of the Invention

The present invention relates to an adjustable suspension device and, more particularly, to an adjustable magneto-rheological fluid device that changes vibration damping and suspension characteristics by controlling the flow of a magneto-rheological fluid through a flexible magneto-rheological fluid compartment to influence the flow of a hydraulic fluid to control the movement of a piston.

2. Background Information

Devices using fluids with controllable characteristics for suspending parts and damping their relative movement are well known. These devices are typically used in vehicle suspension systems and employ electro-rheological (ER) fluids or magneto-rheological (MR) fluids. Designers are more frequently turning to MR fluids, however, due to advantages over ER fluids in yield shear strength (up to 150 kPa versus 20 kPa), power requirements (5 to 12 V versus 20 to 30 kV) and sensitivity to chemical and particulate contamination.

Presently known devices typically include a piston disposed within a cylinder that is filled with a controllable fluid. One end of the cylinder is fixed to one moving part, while a piston rod attached to the piston extends from the opposite end of the cylinder and is fixed to the other moving part. There is a restricted passage, either within the cylinder or within the piston, that is activated to electrically or magnetically control the characteristics of the controllable fluid. The relative movement of the parts is regulated by controlling the characteristics of the fluid which in turn controls the movement of the piston within the cylinder.

The very feature that makes these devices advantageous (the controllable fluid) also makes these devices susceptible to reliability problems due to the abrasive nature of the controllable fluid. The particles suspended in the fluid, which give the fluid the ability to change characteristics upon application of an electrical current or magnetic field, are constantly in abrasive contact with the seal between the piston and the cylinder, breaking the seal down. This leads to a loss of precision in controlling the device as the fluid is allowed to escape around the piston.

In order to address this abrasion problem, special seals and piston components can be used. Their use, however, does not entirely solve the problem. Additionally, these special seals and components disadvantageously increase the cost of the device.

Further, controllable fluids used in the present known devices must have a low volatility and be carefully monitored as movement of the sliding surfaces causes friction that generates heat. The volatility of the controllable fluids used must be low enough that the generated heat does not cause flashing.

Additionally, many known devices have fixed properties that cannot adapt to a changing load. Changes in the suspended mass or movement of an associated vehicle change the load compensation of the device. Devices having fixed suspension elements are not able to adequately respond to these changes in the suspended mass. Thus, without real time compensation for changes in the suspended mass, these devices do not compensate for changes in the suspension natural frequency, leading to less than desirable performance.

Also, these many known devices undergo significant temperature increases during operation. This increasing temperature affects the gas-filled chambers, thus changing the suspension characteristics of the device.

Finally, utilization of the presently-known single cylinder devices is limited by the length of the device. In these devices, all of the components are aligned linearly, wherein applications with small space requirements are left unsatisfied.

It is therefore an object of the present invention to eliminate the abrasion between the controllable fluid and the sliding surfaces of the device. A further object of the present invention is to overcome the aforementioned drawbacks of the prior art. Another object of the invention is to automatically adjust the suspension characteristics of the device to compensate for changes in the suspended mass and the suspension natural frequency. A further object is to compensate for changes in the temperature of the device that affect the performance characteristics of the device.

SUMMARY OF THE INVENTION

An adjustable magneto-rheological (MR) fluid device, according to the present invention, comprises a movable piston adjacent a first chamber containing a first hydraulic fluid for moving the piston. The first hydraulic fluid interacts with a flexible MR compartment containing a MR fluid that flows between a first MR fluid chamber and a second MR fluid chamber within the MR compartment. By controlling the flow of the MR fluid, the device controls the first hydraulic fluid in the first chamber to bias the piston in a first direction.

The flexible MR compartment advantageously isolates the MR fluid from the movable piston. The flexible MR compartment further includes a magnetic valve which separates the first MR chamber and the second MR chamber. The magnetic valve also controls the flow of MR fluid between the chambers. A first elastomeric diaphragm defines a wall of the first MR chamber, while a second elastomeric diaphragm defines a wall of the second MR chamber.

Additionally, the MR fluid device may include a second chamber, having at least one opening, spaced apart from the first chamber on the opposite side of the piston. The opening may connect the second chamber to atmosphere, thereby providing a single-acting device which biases the piston in a first direction. Alternatively, the second chamber may be connected to a third chamber through the opening, wherein the second and third chambers contain a second hydraulic fluid. The second hydraulic fluid interacts with the flexible MR compartment allowing the device to control the second hydraulic fluid to bias the piston in a second direction opposite the first direction.

The adjustable MR fluid device may further provide a gas chamber containing a gas for providing/controlling pressure in the MR fluid device. A gas source communicating with the gas chamber can variably control the pressure therein.

Also, the adjustable MR fluid device may comprise a sensor for detecting the position of the piston and a controller device connecting the sensor and the magnetic valve, wherein the controller device adjusts the magnetic valve to control the movement of the piston.

In one embodiment of the present invention, a cylinder contains the first hydraulic fluid, the flexible MR compartment and the gas chamber.

In another embodiment, a first cylinder contains the first chamber, the second chamber and the piston. A second cylinder contains the first hydraulic fluid chamber, the first MR chamber, the second MR chamber, a magnetic valve and a first and second elastomeric diaphragm.

Finally, although MR fluid is preferably utilized by the present invention for the most beneficial results, other fluids having controllable characteristics, such as electro-rheological fluids, may similarly be used.

Still other objects and advantages of the present invention will become readily apparent to those skilled in the art from the following detailed description without departing from the spirit and scope of the present invention. Accordingly, the drawings and description are to be regarded as illustrative in nature, and not as restrictive.

DETAILED DESCRIPTION OF THE PREFERRED EMBODIMENTS

Figure 1:
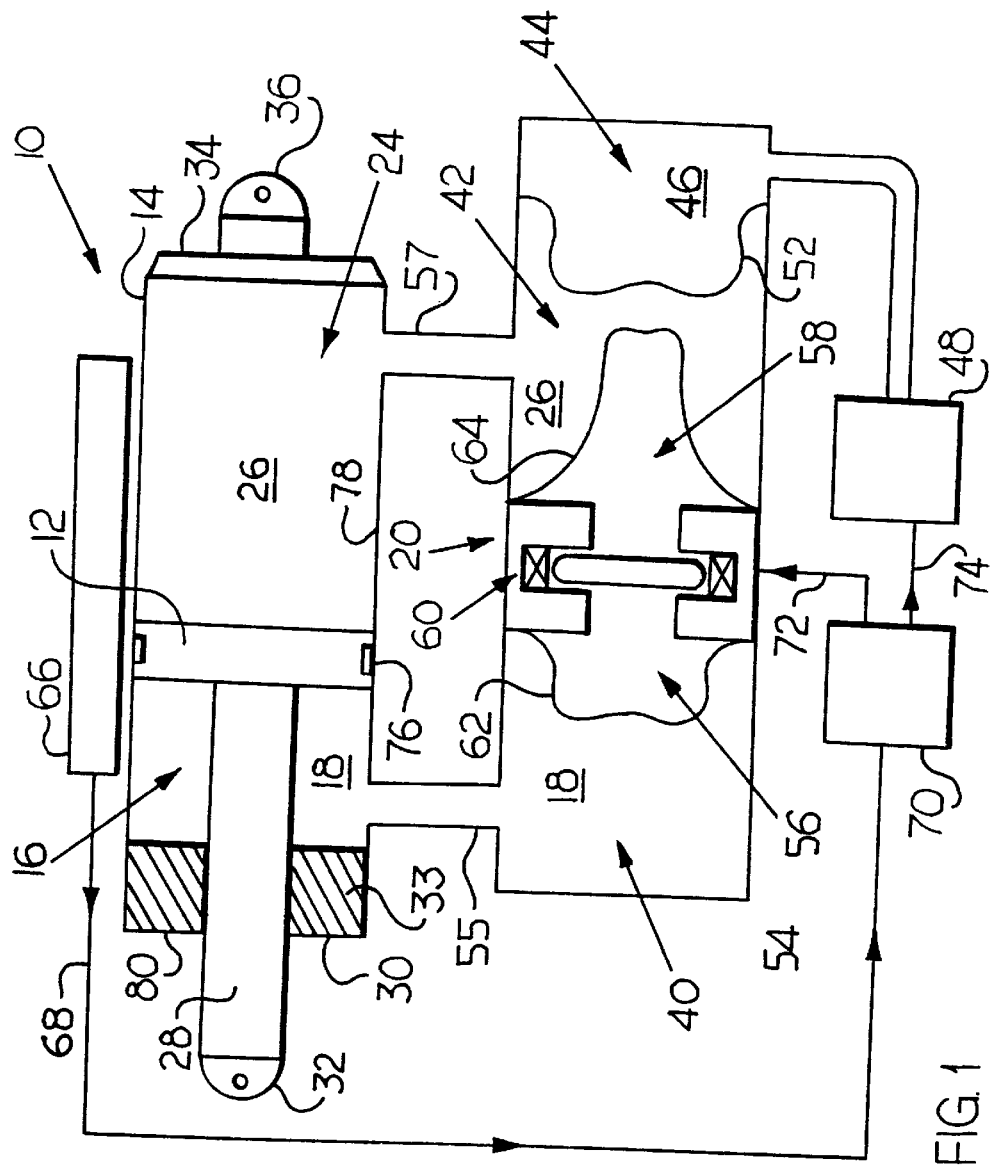
FIG. 1 is schematic representation of a double-acting adjustable magneto-rheological fluid device according to a first embodiment of the present invention.

For purposes of this specification, a hydraulic fluid means any substantially non-abrasive fluid conventionally used in piston/cylinder systems, such as oil, glycerol or the like. Also, a magneto-rheological (MR) fluid means a fluid whose yield shear strength can be changed upon application of a magnetic field. For example, a water-based MR fluid may comprise water, glycol, sodium nitrite, aluminum stearate and reduced iron powder. Many other MR fluid formulations are well known, such as: mineral oil base stock with stearates and oleates as stabilizers; silicon oil base stock with oleic acid and silicates as stabilizers; perfluorinated liquid base stock with fluoro-organic stabilizers; and water base stock with soaps, alcohols, esters and amines as stabilizers. Also, with reference to FIGS. 1–4, the reference numerals for common features are the same.

FIG. 1 illustrates an adjustable MR fluid device 10 for controlling the relative movement between two objects (not shown) constructed in accordance with the present invention. The MR fluid device 10 comprises a movable piston 12 attached to one of the objects and a first cylinder 14 attached to the other object. A first chamber 16 adjacent one side of piston 12 contains a first hydraulic fluid 18. Interacting with first hydraulic fluid 18 is a flexible MR compartment 20 that advantageously isolates an MR fluid 22 contained therein and regulates the flow of the MR fluid 22 within the MR compartment 20. The movement between the two objects can be controlled by the interaction of flexible MR compartment 20 with first hydraulic fluid 18 which biases piston 12 as will be described in greater detail below.

The double-acting MR fluid device 10 further comprises a second chamber 24 spaced apart from first chamber 16 on the opposite side of piston 12. A second hydraulic fluid 26 is contained within second chamber 24 which, along with first hydraulic fluid 18, provides a non-abrasive medium in contact with the sliding surfaces between piston 12 and first cylinder 14. The first hydraulic fluid 18 biases piston 12 in a first direction, while second hydraulic fluid 26 biases the piston 12 in an opposing second direction. The first cylinder 14 contains first chamber 16, piston 12 and second chamber 24 maintaining their relative positions. As piston 12 moves within first cylinder 14, the volumetric size of first chamber 16 changes inversely with the relative volumetric size of second chamber 24.

A piston rod 28 is attached at one end to piston 12 while the other end of the piston rod 28 extends through one end 30 of first cylinder 14 and comprises a first mount 32. Piston rod 28 is slidably guided and supported by bearing 33 adjacent end 30. Bearing 33 allows MR fluid device 10 to accommodate side loading. On the opposite end 34 of the first cylinder 14, a second mount 36 is provided. The mounts 32, 36 are used to releasably attach MR fluid device 10 to the objects whose relative movement is to be controlled, as is well known in the art.

A first hydraulic fluid chamber 40 containing first hydraulic fluid 18 is disposed adjacent flexible MR compartment 20 and is fluidly coupled with first chamber 16 of first cylinder 14. Second hydraulic fluid chamber 42 is spaced apart from first hydraulic fluid chamber 40 on the opposite side of flexible MR compartment 20. Fluidly coupled with second chamber 24 of first cylinder 14, second hydraulic fluid chamber 42 also contains second hydraulic fluid 26. Depending on the desired design characteristics of MR fluid device 10, first hydraulic fluid 18 and second hydraulic fluid 26 may be hydraulic fluids of the same or differing properties.

Gas chamber 44 is located adjacent to and interacts with second hydraulic fluid chamber 42. Gas chamber 44 is supplied with gas 46, such as $N_2$, from gas source 48 which advantageously allows the pressure within the gas chamber to be varied to compensate for changes in the suspended mass and the suspension natural frequency. A wall of gas chamber 44 is defined by first elastomeric diaphragm 52 which variably defines the boundary with second hydraulic fluid chamber 42. As the relative pressure between gas chamber 44 and second hydraulic fluid chamber 42 changes, the position of first elastomeric diaphragm 52 may also change.

First hydraulic fluid chamber 40, flexible MR compartment 20, second hydraulic fluid chamber 42, first elastomeric diaphragm 52 and gas chamber 44 are each contained within a second cylinder 54 which maintains the relative position of these features. Second cylinder 54 and fluid connections 55, 57 beneficially allow these features to be remotely located from first cylinder 14. Remote location of second cylinder 54 is desirable in many applications having space constraints in the typical vicinity of MR fluid device 10. Further, the location of some of the components of MR fluid device 10 within second cylinder 54 advantageously allows first cylinder 14 to have a smaller length.

Flexible MR compartment 20 is defined by first MR fluid chamber 56 and second MR fluid chamber 58 which are fluidly coupled through and separated by magnetic valve 60. A wall of first MR fluid chamber 56 is defined by second elastomeric diaphragm 62 which variably defines the boundary with first hydraulic fluid chamber 40. Similarly, a wall of second MR fluid chamber 58 is defined by third elastomeric diaphragm 64 which variably defines the boundary with first hydraulic fluid chamber 40. Magnetic valve 60 controls the flow of MR fluid 22 between first MR fluid chamber 56 and second MR fluid chamber 58 by changing the yield shear strength of the MR fluid passing through the magnetic valve. Magnetic valve 60 is activated by an electrical current, as is well known.

Elastomeric diaphragms 52, 62, 64 advantageously allow gas chamber 44 and MR fluid chambers 56, 58 to expand and contract. This action, along with the flow control over MR fluid 22 by magnetic valve 60, allows MR fluid device 10 to interact with hydraulic fluids 18, 26 to controllably bias piston 12. Thus, the relative movement between the two objects is controlled allowing for adjustments in the suspension and damping characteristics of MR fluid device 10 to compensate for changes in the suspended mass.

In operation, movement of piston 12 relative to first cylinder 14 is monitored and detected by sensor 66 which may be an electronic, magnetic, optical or other similar sensor, as is well known. Sensor 66 has an output 68, such as an electrical signal, relaying this information to controller 70. Controller 70, which may be a computer or similar data processing device, analyzes output 68 to determine if the relative movement of piston 12 is within a given set of parameters. Parameters such as velocity, acceleration and displacement may be monitored. Controller 70 then sends a first output 72 to magnetic valve 60 and a second output 74 to gas source 48 which respectively controls the flow of MR fluid 22 within flexible MR compartment 20 and the pressure within gas chamber 44. The advantages of this feature will be discussed more fully below. Thus, controller 70 ensures that the movement of piston 12 is either maintained or brought within the given set of parameters by controlling first hydraulic fluid 18 and second hydraulic fluid 26 which respectively bias piston 12 in a first direction and an opposing second direction.

The ability to automatically, continuously and variably adjust the magnetism of magnetic valve 60 based on immediate, real-time feedback on the relative movement of piston 12 allows the present invention to vary the damping and spring characteristics of the MR fluid device 10. Adjusting the magnetism of valve 60 changes the yield shear strength of MR fluid 22 and alters the flow of the MR fluid between first MR fluid chamber 56 and second MR fluid chamber 58. By controlling the flow of MR fluid 22 through magnetic valve 60, movement of piston 12 is controlled through the interaction of first hydraulic fluid 18 with second elastomeric diaphragm 62 of first MR fluid chamber 56 and second hydraulic fluid 26 with third elastomeric diaphragm 64 of second MR fluid chamber 58.

Further, working in conjunction with the control of the MR fluid characteristics or independently thereof, the ability to automatically, continuously and variably adjust the pressure within gas chamber 44 based on immediate, real-time feedback on the relative movement of piston 12 allows the present invention to further vary the spring and damping characteristics of the MR fluid device 10. Changing the pressure within gas chamber 44 affects the movement of piston 12 through interaction with the second hydraulic fluid 26, the flexible MR compartment 20 and the first hydraulic fluid 18. The ability to variably control damping and spring characteristics advantageously allows the present invention to compensate for changes in the suspended mass and the suspension natural frequency. Further, these features give MR fluid device 10 the ability to adjust for changes in the internal temperature of the MR fluid device 10 which changes the damping and spring characteristics of the device 10.

Additionally, in order to optimize the reliability and performance of MR fluid device 10, the piston seal 76 between piston 12 and inside wall 78 of first cylinder 14 and the rod seal 80 between piston rod 28 and first cylinder end 30 must substantially not allow the release of any pressure or fluid. This invention advantageously isolates the abrasive MR fluid 22 which would normally wear down these seals 76, 80.

The present invention is intended for use as a suspension and damping system. Although MR fluid 22 is preferably utilized by the present invention for the most beneficial results, other fluids having controllable characteristics, such as electro-rheological (ER) fluids, may similarly be used. As an example of an intended use, MR fluid device 10 may be attached between the axle and frame of a vehicle. The load of the vehicle on the MR fluid device 10 defines the suspended mass and the associated suspension natural frequency. Other uses, however, may become apparent to one skilled in the art after reading this specification.

Figure 2:
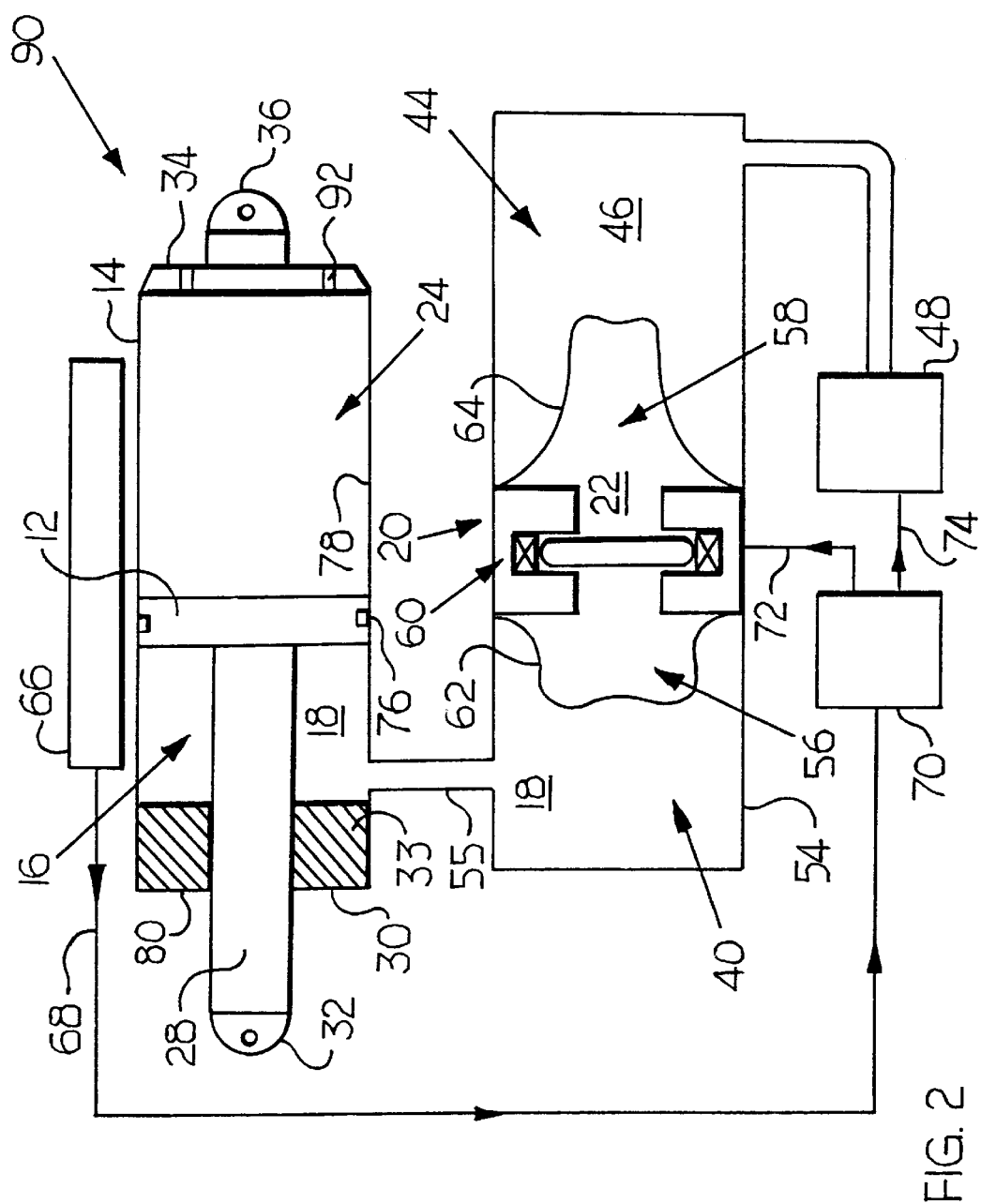
FIG. 2 is a schematic representation of a single-acting adjustable magneto-rheological fluid device according to a second embodiment of the present invention.

Referring to FIG. 2, a single-acting MR fluid device 90 is depicted which differs from the double-acting MR fluid device 10 in that only a first hydraulic fluid 18 is provided to bias piston 12 in a first direction, tending to pull piston rod 28 into first cylinder 14. Also in MR fluid device 90, end 34 of first cylinder 14 contains at least one opening or passage 92 which vents second chamber 24 to atmosphere. Additionally, gas chamber 44 is directly adjacent second MR fluid chamber 58 since the fluid connection between second chamber 24 and second cylinder 54 has been removed. This embodiment is useful for hung suspension applications in which the sprung mass is hung from MR fluid device 90.

The maximum force that can be exerted by MR fluid device 90, as piston 12 is compressing first hydraulic fluid 18, causes a maximum acceleration of about one "g" or about 32 ft/sec/sec. This differs greatly from the double-acting MR fluid device 10 depicted in FIG. 1, which does not have this one "g" limitation and can be designed for virtually unlimited force application in either direction.

The description of the physics of the total force, F, of MR fluid device 90 can be given by:

$$F = F_{MR}(v, I) + F_{GAS}(x, P)$$

where:

$F_{MR}$=the force due to the action of the magnetic valve 60 and the MR fluid 22;

$F_{GAS}$=the force due to the spring characteristic of gas chamber 44;

v=the velocity of piston 12 and rod 28;

I=the current through magnetic valve 60;

x=the displacement of piston 12 and rod 28; and

P=the pressure in second cylinder 54.

The force produced by the gas chamber 44, $F_{GAS}$, can be calculated by assuming an isentropic process. This further assumes that compressing the fluids within cylinders 14, 54 is a faster process than the heat transfer process within the cylinders, thereby validating the adiabatic assumption. The above equation further assumes that the process within gas chamber 44 is nearly loss free (i.e., free compression and expansion).

Using these assumptions, the following equation is obtained:

$$F_{GAS} = (A_p\, P_o\, V_o)/(V_o - A_p\, x)$$

where:

$A_p$=area of piston 12;

$P_o$=pressure within gas chamber 44 when piston 12 is at a predetermined position corresponding to a mean ride height for the vehicle;

$V_o$ = volume of second cylinder 54; and x = displacement of piston 12 from the predetermined position.

Using the above equations, controller 70 uses output 68 of the measured displacement of piston 12 from sensor 66 to adjust the pressure within second cylinder 54 to raise or lower the suspended mass to the mean ride height. As a result, the suspension natural frequency would not vary with the sprung mass.

Figure 3:
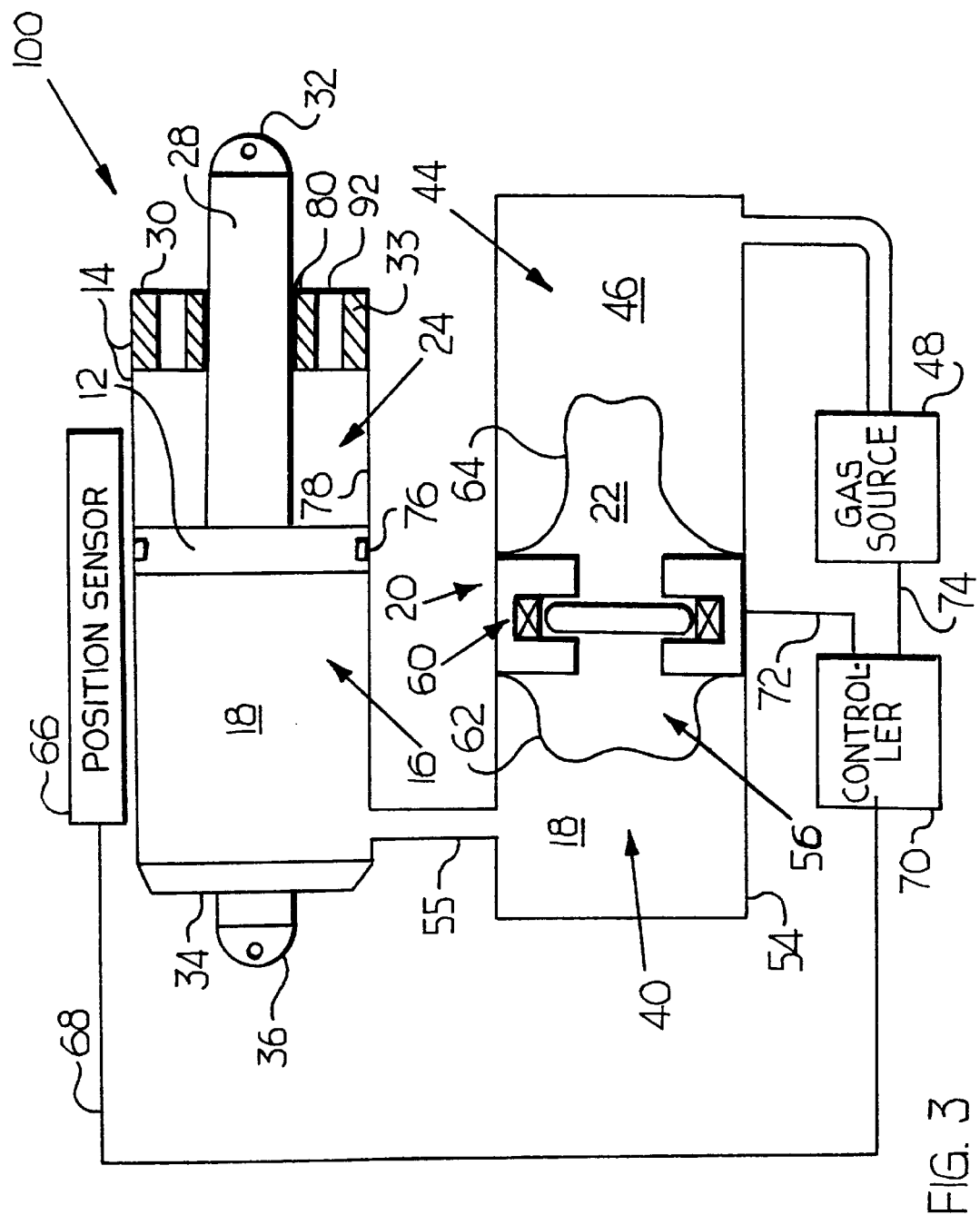
FIG. 3 is a schematic representation of a magneto-rheological fluid device according to a third embodiment of the present invention which is similar to the device shown in FIG. 2, but acting in the opposite direction.

Referring to FIG. 3, a single-acting MR fluid device 100 is depicted which acts oppositely to MR fluid device 90 (FIG. 2). For MR fluid device 100, the pressure from second cylinder 54 acts to push piston rod 28 out of first cylinder 14. Also, passages 92 extend through end 30 of first cylinder 14 rather than through end 34. This embodiment is useful for applications where the sprung mass rests on the MR fluid device 100.

Figure 4:
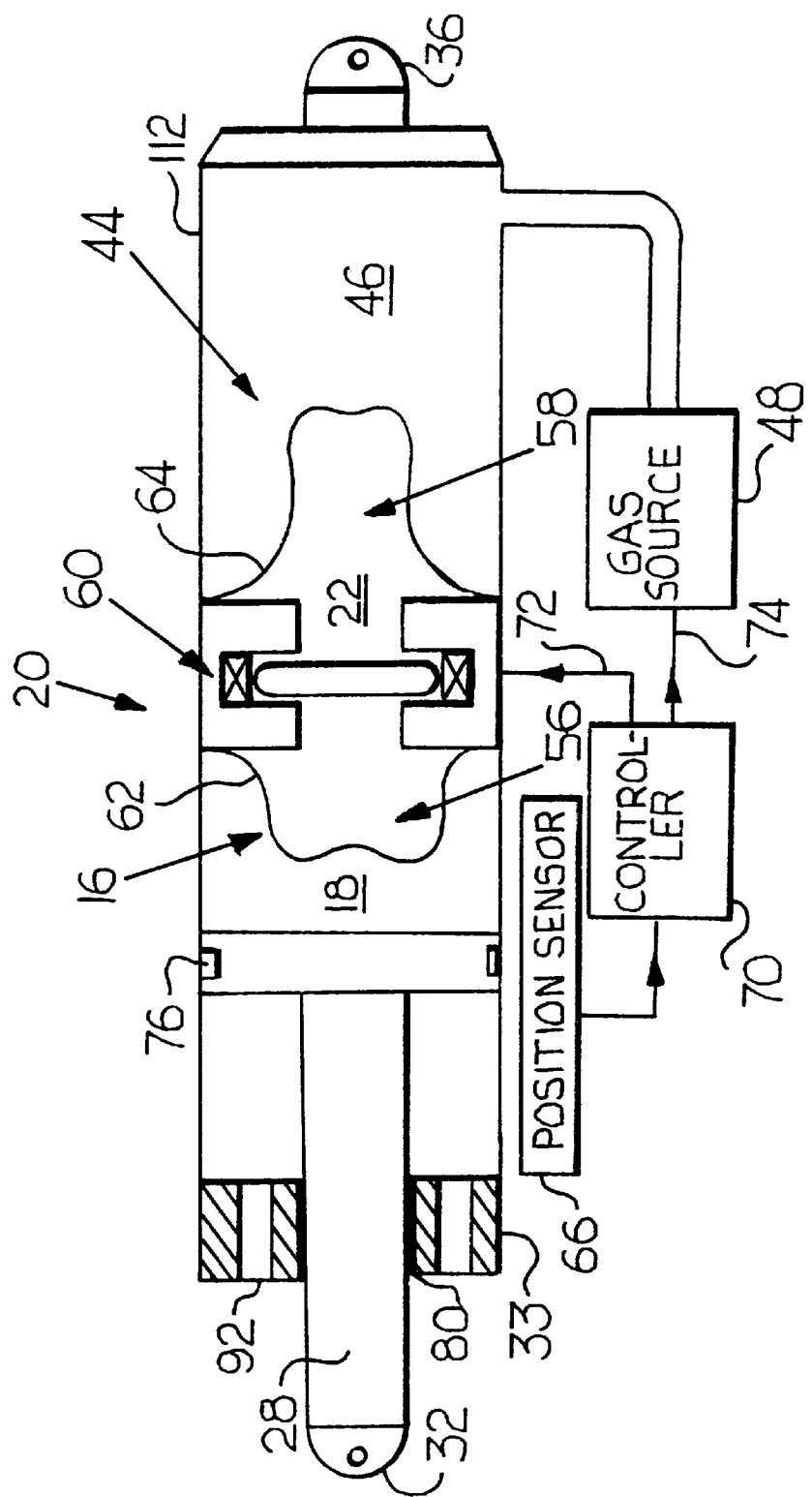
FIG. 4 is a schematic representation of a single cylinder, single-acting magneto-rheological fluid device according to a fourth embodiment of the present invention.

Referring to FIG. 4, a single-acting MR fluid device 110 is depicted wherein the components of the device are substantially the same as in the previous embodiments, but they are integrated into a single cylinder 112. By combining all of the features into a single cylinder 112, the length of MR fluid device 110 will generally be greater than a comparable MR fluid device having separate cylinders (such as in FIGS. 1–3). The use of MR fluid device 110 is advantageous in situations where space constraints requiring remote mounting of components of the device (as is possible with the devices of FIGS. 1–3) are not a concern. Further, MR fluid device 110 provides a cost savings by requiring less parts.

Although the invention has been described with reference to these preferred embodiments, other embodiments can achieve the same results. Variations and modifications of the described invention will be obvious to those skilled in the art and are within the scope of the present invention. The scope of the present invention is intended to be defined in the following claims and equivalents thereof.

What is claimed is:

1. An adjustable suspension device comprising: a first cylinder;

a first chamber positioned within said first cylinder;

a second chamber positioned within said first cylinder spaced apart from said first chamber; a movable piston positioned within said first cylinder separating said first chamber and said second chamber;

a second cylinder fluidly coupled to said first cylinder;

a first hydraulic fluid chamber, contained within said second cylinder, fluidly coupled with said first chamber;

a second hydraulic fluid chambers contained within said second cylinder, fluidly coupled with said second chamber;

a flexible fluid compartment contained within said second cylinder;

a first flexible chamber contained within said flexible fluid compartment;

a second flexible chamber contained within said flexible fluid compartment in fluid communication with said first flexible chamber;

a predetermined fluid contained within said first flexible chamber and Said second flexible chamber, wherein said predetermined fluid is a controllable fluid selected from the group consisting of a magneto-rheological fluid and an electro-rheological fluid;

a first hydraulic fluid within said first chamber and said first hydraulic fluid chamber for biasing said piston in a first direction;

a second hydraulic fluid within said second chamber and said second hydraulic fluid chamber for biasing said piston in a second direction;

a valve between said first flexible fluid chamber and said second flexible fluid chamber, wherein said valve controls the flow of said predetermined fluid between said first flexible chamber and said second flexible chamber to control the movement of said piston through said first hydraulic fluid and said second hydraulic fluid;

a first elastomeric diaphragm disposed within said second cylinder defining a wall of said first flexible chamber; and a second elastomeric diaphragm disposed within said second cylinder defining a wall of said second flexible chamber.

2. An adjustable suspension device as recited in claim 1 wherein said predetermined fluid is magneto-rheological fluid and further comprising a gas chamber and a gas within said gas chamber.

3. An adjustable magneto-rheological fluid device as recited in claim 2 further comprising a gas source communicating with said gas chamber for variably controlling the pressure therein.

4. An adjustable magneto-rheological fluid device as recited in claim 2 further comprising a sensor for detecting the position of said piston and a control means connecting said sensor and said magnetic valve, wherein said control means adjusts said magnetic valve to control the position of said piston.

5. An adjustable suspension device as recited in claim 1 further comprising a gas chamber disposed within said second cylinder and a gas within said gas chamber.

6. An adjustable suspension device as recited in claim 5 further comprising a gas source communicating with said gas chamber for variably controlling the pressure in said adjustable suspension device.

7. An adjustable suspension device as recited in claim 6 further comprising a sensor for detecting the position of said piston, and a control means connecting said sensor, said gas source and said magnetic valve, wherein said control means adjusts said gas source and said magnetic valve and to control the position of said piston.

* * * * *